United States Patent
Johnson

(10) Patent No.: US 6,793,120 B2
(45) Date of Patent: Sep. 21, 2004

(54) APPARATUS AND METHOD FOR MOUNTING AN ELECTRICAL CONNECTOR TO A GLASS SHEET OF A VEHICLE WINDOW

(75) Inventor: William A. Johnson, Hudsonville, MI (US)

(73) Assignee: Donnelly Corporation, Holland, MI (US)

( * ) Notice: Subject to any disclaimer, the term of this patent is extended or adjusted under 35 U.S.C. 154(b) by 63 days.

(21) Appl. No.: 10/346,637

(22) Filed: Jan. 17, 2003

(65) Prior Publication Data

US 2003/0178394 A1 Sep. 25, 2003

Related U.S. Application Data

(60) Provisional application No. 60/349,737, filed on Jan. 17, 2002.

(51) Int. Cl.[7] ............................................. B23K 31/02
(52) U.S. Cl. ..................... 228/122.1; 228/200; 228/254
(58) Field of Search .......................... 228/122.1–124.7, 228/245–262, 200; 219/202–203, 411; 392/355–356, 391, 393, 419, 420, 375–376, 407–440

(56) References Cited

U.S. PATENT DOCUMENTS

| | | | |
|---|---|---|---|
| 3,347,729 A | 10/1967 | Seefluth | 156/380 |
| 4,184,000 A | 1/1980 | Denman | 428/347 |
| 4,388,522 A | 6/1983 | Boaz | 219/522 |
| 4,391,663 A | 7/1983 | Hutter, III | 156/64 |
| 4,453,669 A | 6/1984 | Karla et al. | 237/12.3 R |
| 4,488,033 A | 12/1984 | Trachtenberg | 219/522 |
| 4,704,175 A | 11/1987 | Kunert et al. | 156/108 |
| 4,785,988 A | * 11/1988 | Topel et al. | 228/122.1 |
| 4,826,266 A | * 5/1989 | Baird et al. | 359/359 |
| 4,940,884 A | 7/1990 | Gillery | 219/203 |
| 4,950,348 A | 8/1990 | Larsen | 156/275.3 |
| 5,005,020 A | * 4/1991 | Ogawa et al. | 343/713 |
| 5,023,403 A | 6/1991 | Eckardt et al. | 174/94 R |
| 5,035,045 A | 7/1991 | Bowen et al. | 29/623.2 |
| 5,064,494 A | 11/1991 | Duck et al. | 156/273.5 |
| 5,120,498 A | 6/1992 | Cocks | 420/580 |
| 5,143,273 A | * 9/1992 | Topel et al. | 228/56.3 |

(List continued on next page.)

FOREIGN PATENT DOCUMENTS

| | | | |
|---|---|---|---|
| DE | 3124138 | 12/1932 | ............ B60J/1/00 |
| DE | 2352294 | 10/1973 | ........... C03C/27/12 |
| DE | 2406340 | 12/1975 | ........... C03C/27/12 |
| EP | 0061183 | 9/1982 | ........... C03C/27/12 |
| EP | 0371807 | 6/1990 | ........... D04H/1/54 |
| JP | 4047090 | 2/1992 | |

OTHER PUBLICATIONS

Product Data Sheet—SpotIR InfRared Heaters Models 4150 & 4085, Research Inc. Eden Prairie, MN, 5 pages.

*Primary Examiner*—Kiley Stoner
(74) *Attorney, Agent, or Firm*—Van Dyke, Gardner, Linn & Burkhart, LLP

(57) ABSTRACT

An electrical connector is soldered or affixed to a conductive element of a glass sheet of a vehicular window via radiation heating of a layer of solder with an infrared radiative heating device. The heating device may include an infrared lamp and a reflector, which functions to direct the radiant energy from the lamp to a target region generally corresponding with the location of the solder layer between the electrical connector and the conductive element. The heating device is operable to rapidly and substantially heat the solder layer to a desired temperature to melt the solder layer, while substantially limiting directing of heat to the glass sheet. The electrical connector may be affixed at a vehicular or modular window assembly plant, such that the glass sheet may be transported from a glass manufacturing plant to the vehicular or modular window assembly plant without the electrical connector.

33 Claims, 6 Drawing Sheets

U.S. PATENT DOCUMENTS

| | | | |
|---|---|---|---|
| 5,151,149 A | 9/1992 | Swartz | 156/379.8 |
| 5,208,444 A | 5/1993 | Winter et al. | 219/547 |
| 5,329,094 A | 7/1994 | Murphy et al. | 219/243 |
| 5,331,784 A | 7/1994 | Agrawal et al. | 52/393 |
| 5,352,479 A | 10/1994 | Iida et al. | 27/96 |
| 5,407,119 A * | 4/1995 | Churchill et al. | 228/124.5 |
| 5,440,849 A | 8/1995 | Agrawal et al. | 52/393 |
| 5,444,814 A | 8/1995 | Hofius, Sr. | 392/407 |
| 5,522,954 A | 6/1996 | Bennett et al. | 156/64 |
| 5,543,601 A | 8/1996 | Bartrug et al. | 219/203 |
| 5,589,026 A | 12/1996 | Perecman | 156/286 |
| 5,596,335 A | 1/1997 | Dishart et al. | 343/713 |
| 5,628,859 A | 5/1997 | Janin et al. | 156/273.3 |
| 5,676,562 A | 10/1997 | Fukuda | 439/329 |
| 5,735,446 A | 4/1998 | White et al. | 228/114.5 |
| 5,738,554 A | 4/1998 | Borger et al. | 439/874 |
| 5,818,631 A * | 10/1998 | Askinazi et al. | 359/350 |
| 5,897,964 A | 4/1999 | White et al. | 428/630 |
| 5,984,165 A * | 11/1999 | Inoue et al. | 228/180.22 |
| 6,019,272 A * | 2/2000 | Badgley et al. | 228/114.5 |
| 6,041,994 A * | 3/2000 | Hwang et al. | 228/4.5 |
| 6,054,001 A | 4/2000 | Swanson et al. | 156/108 |
| 6,138,897 A | 10/2000 | Allor et al. | 228/114.5 |
| 6,203,639 B1 | 3/2001 | Swanson et al. | 156/108 |
| 6,253,988 B1 * | 7/2001 | Pereira | 228/122.1 |
| 6,521,083 B1 | 2/2003 | Swanson et al. | 156/380.9 |
| 6,552,690 B2 * | 4/2003 | Veerasamy | 343/713 |
| 2003/0034926 A1 * | 2/2003 | Veerasamy | 343/713 |
| 2003/0178394 A1 * | 9/2003 | Johnson | 219/85.13 |

* cited by examiner

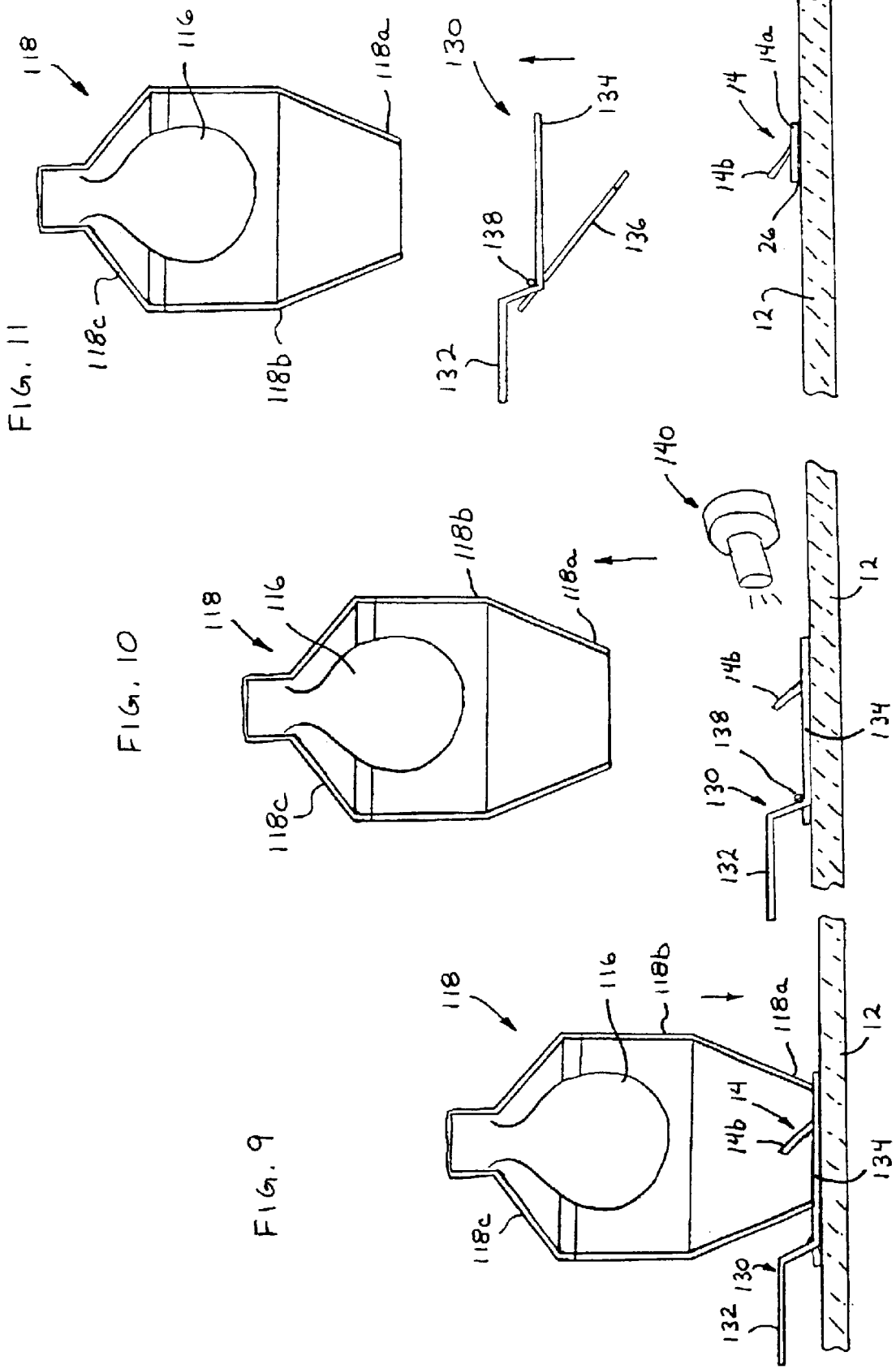

APPARATUS AND METHOD FOR MOUNTING AN ELECTRICAL CONNECTOR TO A GLASS SHEET OF A VEHICLE WINDOW

CROSS-REFERENCE TO RELATED APPLICATION

The present application claims priority of U.S. provisional application, Ser. No. 60/349,737, filed Jan. 17, 2002 by Johnson for METHOD OF MOUNTING ELECTRICAL CONNECTOR TO VEHICLE WINDOW (Attorney Docket DON02 P-961), which is hereby incorporated herein by reference.

FIELD OF THE INVENTION

The present invention relates generally to vehicle windows and, more particularly, to vehicle windows having electrical elements, such as defroster elements or antenna elements, at a surface of a glass sheet of the window, and a method and apparatus for attaching such electrical elements to the glass sheet.

BACKGROUND OF THE INVENTION

Many windows for vehicles, such as rear windows or windshields or the like, include electrical components or conductive elements, such as defrosting heater elements, such as defroster lines, strips or coils, or antenna elements or the like at or along a surface of a glass sheet of the window. Such conductive elements typically comprise electrically conductive silver flakes, which are mixed with low melting glass and applied or screened as a thick film to a surface of the glass sheet for the window or to a ceramic frit layer on the surface of the glass sheet. The silver layer is typically applied when the glass sheet has been cut to its desired shape and/or when a ceramic frit layer has been applied or screened to portions of the glass sheet. The glass sheet, which includes the defroster strips and conductive elements, is typically heated in a furnace to heat the glass to its melting point and to melt and fuse the silver conductive flakes and ceramic frit. The heated glass sheet is then molded to its desired shape and quickly cooled or tempered to achieve the tempered glass for the window. Typically, this is performed at a window or glass sheet manufacturing plant or fabrication plant.

Typically, after the glass sheet is formed, a number of such glass sheets are packaged and moved to another area of the glass manufacturing plant to have an electrical connector or clip attached to the silver conductive element. Typically, the connector is soldered to the conductive layer that is on a surface of the glass sheet at the end of the conductive line or strip. This is accomplished by various known soldering approaches, such as induction heating, contact heating or resistance heating, whereby the solder on the clip is heated to melt the solder and then cooled to secure the solder and the clip to the silver layer and frit layer on the glass sheet. Such known methods of soldering the connector to the conductive layer or element typically are capital intensive and may require costly equipment and/or typically provide challenges or difficulties in process control.

After the connector or tab is attached to the conductive element on the surface of the glass sheet, the glass sheet is not as well suited for dense packaging as it was before attachment of the connector. Therefore, the glass sheets are typically repacked in a less dense manner after attachment of the connectors and are then shipped to a vehicular or modular window assembly or manufacturing line, typically at a different assembly plant or facility, for further processing, which may include adding hinges, seals, frames or the like to the glass sheet to complete the modular window assembly. Such a conventional process is shown generally in FIG. 1.

Because of the costs and challenges associated with such known methods of attaching the electrical connectors, and because of the time involved in heating and cooling the connector, solder layer and glass sheet during such attachment processes, such approaches are typically performed at the glass sheet fabrication plant and are not suited for application at the modular window assembly plant. Therefore, the glass sheet of a vehicle window currently is typically packaged two times within the glass sheet fabrication or manufacturing plant, such that the current process is inefficient and, thus, may add to the cost of the completed window assembly. Also, because the electrical connector is typically mounted or secured to the glass sheet at the glass manufacturing plant, the glass sheets may be packaged in a less dense manner when transported to the vehicular or modular window assembly plant, which is typically remote from the glass manufacturing plant.

Therefore, there is a need in the art for a window manufacturing and assembling process that overcomes the shortcomings of the prior art processes.

SUMMARY OF THE INVENTION

The present invention is intended to provide an apparatus and method for attaching an electrical connector to a conductive element, such as a silver conductive layer, such as an antenna element or defrosting heating element, of a glass sheet of a vehicular or modular window assembly. The connector may be soldered to the conductive element or bus bar of the glass sheet, which may comprise a tempered glass sheet or other type of glass sheets, such as an annealed glass sheet, a laminated glass sheet or the like, and may comprise a tinted or untinted glass sheet and/or may include solar coatings or the like, by heating the solder joint via substantially infrared radiation heating. The method is preferably performed at a vehicular or modular window assembly line or plant or facility, where a frame and/or hinge and/or other components may be assembled or applied to the glass sheet portion of the modular window assembly.

According to an aspect of the present invention, an electrical connector is applied to a conductive element, which is deposited or disposed on a surface of a glass sheet of a window and exposed at a terminal end of an electrical element, via radiation heating of the connector or a solder layer at the connector with an infrared radiative heating device. The conductive element may be a silver conductive layer or line, such as an antenna element or defroster heater element or the like. The heating device preferably comprises an infrared lamp and a reflector, which functions to focus or channel or funnel or otherwise direct the radiant energy from the lamp selectively to the region of the solder joint to be established, while minimizing radiant heating of peripheral and adjacent regions of the glass sheet or panel. The infrared lamp is operable to generate infrared radiant energy, which preferably is in the short wavelength or far infrared region, such as around 800–1500 nm, more preferably approximately 1000–1300 nm, and most preferably approximately 1100–1200 nm, at a target or focal region generally corresponding with the location of a solder layer or the like between the electrical connector and the conductive element. The connector preferably includes a layer of solder or other suitable material deposited on or integral with the surface of the connector to be connected to the conductive element, such that when the solder and/or connector are heated to a desired temperature, the solder melts and then cools and refreezes to bond or adhere to the conductive element on the glass sheet or window surface.

According to another aspect of the present invention, a method for applying an electrical connector to a conductive element disposed on a surface of a glass sheet of a window comprises providing a glass sheet having a conductive element disposed on a surface thereof. A substantially infrared radiative heating device is provided which comprises an infrared lamp and a reflector configured to focus or funnel or otherwise direct radiant energy from the lamp at a target or focal region. An electrical connector is positioned at the conductive element of the glass sheet, and the heating device is positioned relative to the glass sheet such that the target or focal region corresponds generally with the solder joint or solder layer between the electrical connector and the conductive element of the glass sheet. The electrical connector is attached to the conductive element via radiation heating of the solder layer with the infrared radiative heating device.

The electrical connector may be applied to the conductive element via radiation heating of a layer of solder at a surface of the electrical connector to be connected to the conductive element, such that when the solder and the electrical connector are heated to a desired temperature, the solder melts and then cools and refreezes to bond or adhere to the conductive element on the window surface.

The heating device may comprise a shaped reflector, such as a parabolic-shaped reflector or an ellipsoid-shaped reflector or a nozzle-shaped reflector or the like, which is shaped or configured to direct radiant energy from the lamp at a target or focal region. The shaped reflector may comprise a truncated ellipsoidal reflector defining first and second focal points. The infrared lamp may be positioned generally at the first focal point and the target or focal region may be generally at the second focal point.

The radiative heating device may rapidly and substantially heat the solder layer, while substantially limiting or substantially avoiding directing radiant heating energy to the glass sheet. The heating device may include a shield or holding device which temporarily holds the electrical connector at the glass sheet during the radiation heating process and substantially limits directing of heat toward and to the glass sheet and/or substantially limits dissipation of heat into the glass sheet by shielding the glass sheet from the energy generated by the radiative heating device.

The electrical connector may be positioned at a first surface of the glass sheet, while the heating device is positioned at a second surface of the glass sheet which is opposite the first surface. The heating device may be operable to radiate energy through the glass sheet to the target or focal region at the first surface of the glass sheet. The target region and solder layer at the electrical connector may thus be heated by the heating device, while the glass sheet and surrounding area are not substantially heated.

The glass sheet may be manufactured or fabricated at a glass or window manufacturing or fabrication plant or facility and then may be transported to a vehicular or modular window assembly plant or facility remote from the glass manufacturing plant. The electrical connector may be attached to the conductive element of the glass sheet at the modular window assembly plant.

According to another aspect of the present invention, an attachment system for attaching or soldering an electrical connector to a glass sheet comprises a heating device and a holding device. The heating device comprises an infrared radiative heat source positioned at least partially within a shaped reflector. The shaped reflector is shaped or configured to focus or channel or funnel or otherwise direct infrared radiant energy from the lamp at a target region. The holding device is configured to temporarily hold the electrical connector during the heating process. The heating device and the holding device are arrangable relative to one another and relative to the glass sheet such that the holding device and the electrical connector are positionable generally at a surface of the glass sheet and the heating device is positionable generally at the holding device with a solder layer being generally at the target region. The heating device is operable to generate and direct the energy at the target region to heat and melt the solder layer while the holding device holds the electrical connector and substantially limits directing of the energy to the glass sheet.

The shaped reflector may comprise a parabolic-shaped reflector, an ellipsoid-shaped reflector and a nozzle-shaped reflector. The shaped reflector preferably comprises a polished metallic interior surface for reflecting and directing the energy at the target region.

The holding device generally surrounds the electrical connector and substantially limits directing of the infrared radiant energy to the glass sheet, such as around the electrical connector to the glass sheet, during the heating process. The holding device may comprise a base portion and a pivotable portion which is pivotable relative to the base portion to release the electrical connector as the holding device is moved from the electrical connector and the glass sheet.

Therefore, the radiation heating device and process and system of the present invention provides for rapid heating of a layer of solder at a window element or electrical connector at a glass sheet, while substantially limiting directing of the heat to the glass sheet. Therefore, the soldering process may be completed in a short period of time without substantially heating the glass sheet, such that the attachment of the window element to the glass sheet may be performed at a modular window assembly plant, which typically attaches a frame, seal and/or hinge or the like to the glass sheet. Also, because the radiation heating process of the present invention requires less capital investment than known induction heating processes, the radiation heating process may be performed by the final modular window assembler or manufacturer. The glass sheet window portions thus may be densely packaged a single time by the glass sheet manufacturer or at the glass manufacturing plant or glass fabrication plant (which cuts, shapes and tempers the glass and applies the frit layer and electrical or conductive layers or lines to the glass sheet) and then shipped to the vehicular or modular window assembly plant, which then may add the frame portions, seals, hinges and/or the like and the electrical connectors to the glass sheet portions. The completed vehicular or modular window assemblies are then shipped to the automotive manufacturer's assembly plant for installation on vehicles. Because the window elements, such as electrical connectors and/or the like, are applied or attached or soldered to the conductive elements on the glass sheets at the modular window assembly plant, the glass sheets may be densely packaged for shipment to the modular window assembly plant, and may be only packed and unpacked one time, thereby providing a lower cost manufacturing process for vehicle modular window assemblies.

These and other objects, advantages, purposes and features of the present invention will become apparent upon review of the following specification in conjunction with the drawings.

BRIEF DESCRIPTION OF THE DRAWINGS

FIGS. 9–11 are side elevations and partial sectional views of the heating and cooling and retracting processes for attaching an element to a glass sheet in accordance with the present invention.

DESCRIPTION OF THE PREFERRED EMBODIMENTS

Figure 2:
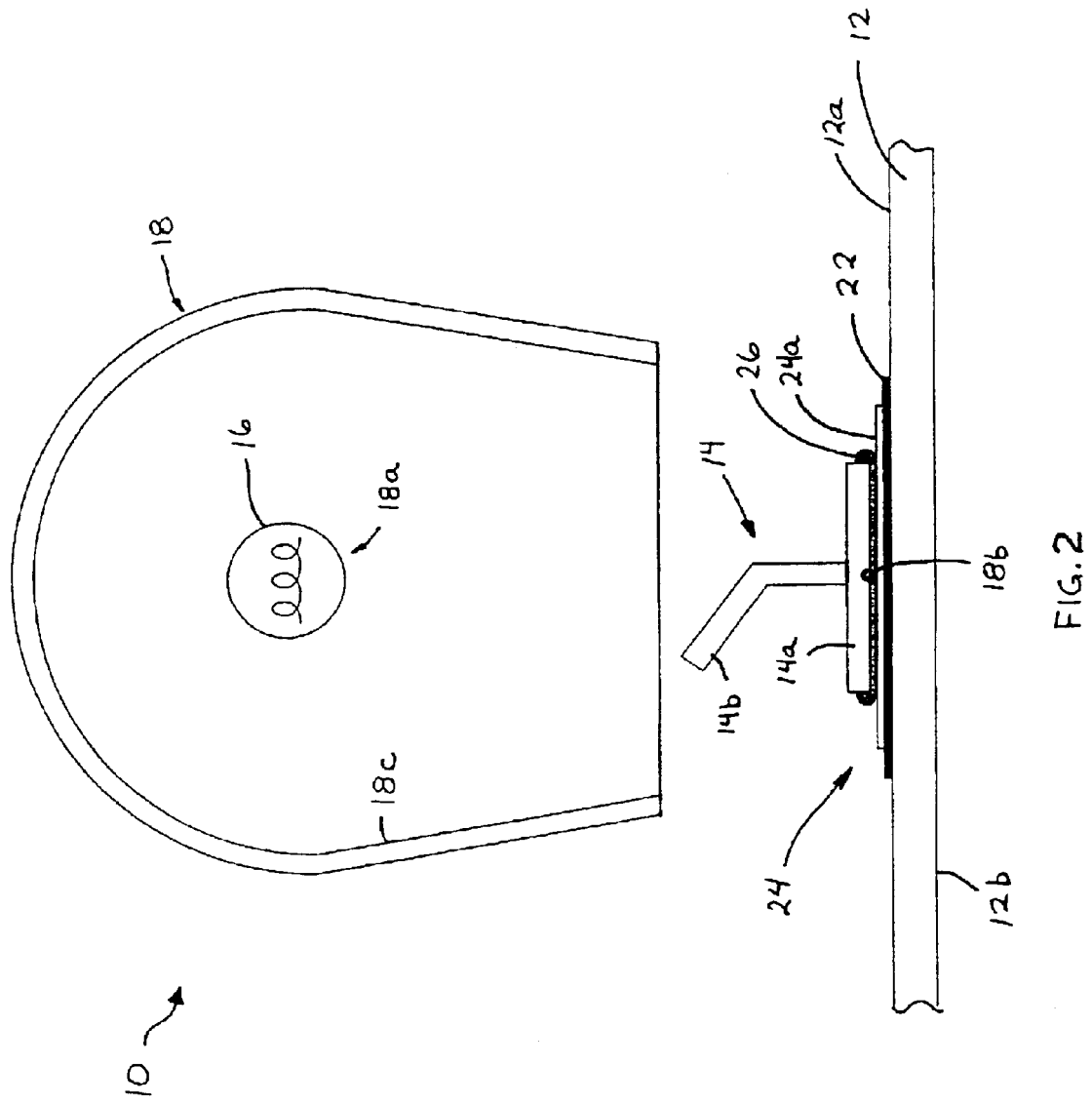
FIG. 2 is a sectional view of a heating device in accordance with the present invention, as positioned at an electrical connector to be soldered to a conductive element on a glass sheet.

Referring now specifically to the drawings and the illustrative embodiments depicted therein, an infrared radiation heating device 10 is positionable at or near a glass sheet 12, such as a tempered glass sheet or an annealed glass sheet or a laminated glass sheet or panel or the like, and operable to heat a layer of solder 26 or the like at an electrical connector or clip 14 to attach or solder the connector 14 to a conductor or conductive element 24a of an electrical component or accessory 24 on the glass sheet 12 (FIG. 2). Heating device 10 includes an infrared lamp 16 and a reflector or reflective shield 18, which functions to direct or focus or channel or funnel the radiant energy generated from lamp 16 to a target location or focal region 18b, such that the heat source or lamp does not contact the target area or location or connector during the heating process. The electrical connector and glass sheet are positioned relative to the heating device 10 such that the solder layer at the electrical connector 14 is generally at the focal region 18b. The solder layer 26 is heated by the infrared radiative heating device 10 and melts, whereby the heating device 10 is deactivated or moved away from the electrical connector and solder layer to allow the solder layer to cool and refreeze and thus bond or adhere the electrical connector to the conductive element of the glass sheet. The electrical connector 14 may be temporarily held or secured in place during the heating and cooling processes to maintain the connector in the appropriate position at the glass sheet until the solder layer has cooled and hardened and bonded or adhered the connector to the conductive element on the glass sheet.

Glass sheet 12 comprises a sheet formed for a vehicle window, and preferably comprises tempered glass, but may comprise an annealed glass sheet or a laminated glass sheet or the like, without affecting the scope of the present invention. A ceramic frit layer 22 is preferably formed or disposed partially on a surface 12a of the glass sheet 12 (which may be the interior surface of the window after the modular window assembly is completed and installed on a vehicle). The glass sheet 12 may comprise a tinted or untinted glass sheet or panel and/or may include solar coatings or the like, without affecting the scope of the present invention. Glass sheet 12 includes electrical component or accessory 24, such as an antenna or defroster or the like, which comprises conductive layer or element 24a, such as a silver conductive layer, line or bus bar or the like, formed on or applied to the window surface 12a, such as on ceramic frit layer 22 at an end of a conductor or conductive line or strip. Electrical connector 14 may be attached to an end of the conductive element 24a by heating a solder layer 26 on connector 14 with heating device 10 to solder connector 14 to conductive element 24a. Although shown and described as attaching an electrical connector to a conductive layer, the heating device and method of the present invention may be equally suitable for use in fastening or attaching or securing other components or hardware or window elements, such as window hardware, clips, studs, antennae and/or the like, to a glass sheet of an automotive window.

Figure 3:
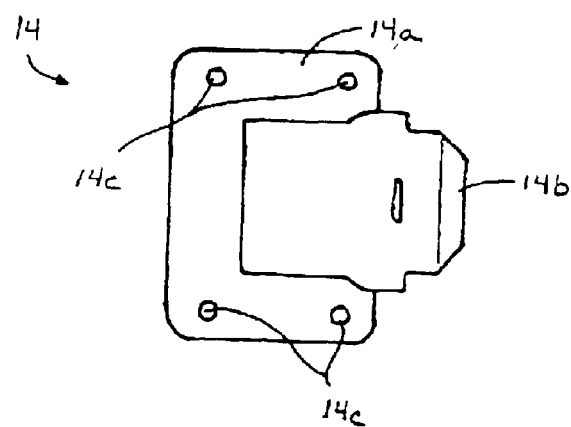
FIG. 3 is a top plan view of an electrical connector suitable for soldering to a conductive element on a window surface.
Figure 4:
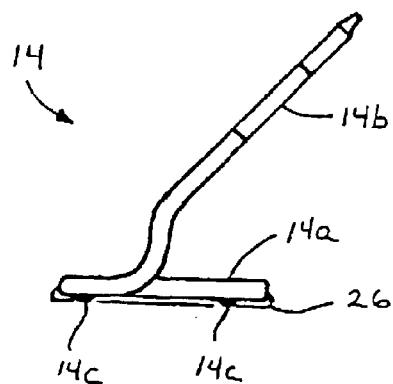
FIG. 4 is a side elevation of the electrical connector of FIG. 3.

Connector 14 may comprise an electrical connector for connecting to an electrical wiring of the vehicle, such as a connector or clip or terminal of the type commercially available from Antaya Technologies Corp. of Cranston, R.I. As shown in FIGS. 2–4, connector 14 includes a base portion 14a and a connector portion 14b extending outward from base portion 14a. Connector portion 14b is adapted to connect to a corresponding connector of a vehicle (not shown) when the modular window assembly is installed to the vehicle. Base portion 14a preferably includes a plurality of dimples or protrusions 14c extending from the lower or contact surface of base portion 14a. The layer of solder 26 may be applied to or disposed at the contact surface of base portion 14a for securing the base portion 14a to the conductive element of the glass sheet. Optionally, the connector 14 may be substantially dipped in solder or the like or coated with a solder layer, without affecting the scope of the present invention. The protrusions 14c function to provide and maintain an appropriate space or gap between base portion 14a and the conductive element 24a on the window surface 12a to enhance the effectiveness of the solder 26 at the conductive element 24a.

Heating device 10 comprises a radiation heating device which radiates energy to a target or focal region. Heating device 10 may comprise a known radiation or infrared heater, such as the type commercially available from Research, Inc. of Eden Prairie, Minn. Infrared lamp 16 preferably comprises a high intensity, quartz infrared lamp or heat source and is positioned within reflector 18. Infrared lamp 16 may comprise a tubular quartz, short wave infrared lamp or may comprise a long wave infrared lamp, depending on the application of the heating device. Optionally, infrared lamp or radiative source 16 may comprise an EVD 36 volt, 400 watt lamp commercially available from Wiko Ltd. of Orland Park, Ill., without affecting the scope of the present invention. Preferably, at least some, and more preferably a considerable portion, of the energy radiated from the selected lamp or radiative source is at or within the near-infrared or infrared region of the energy spectrum, such as approximately 800–1500 nm, more preferably approximately 1000–1300 nm, and most preferably approximately 1100–1200 nm. It is further envisioned that two or more infrared lamps may be implemented within reflector 18, depending on the application, without affecting the scope of the present invention.

Figure 5:
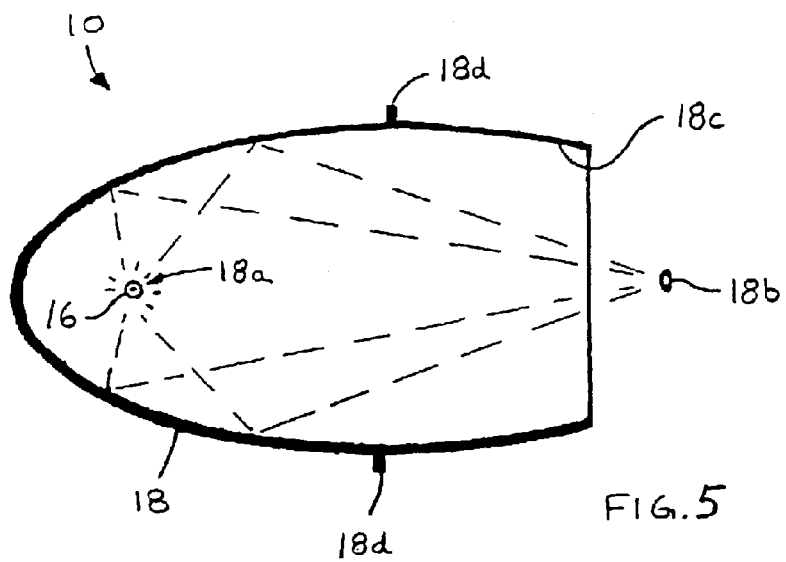
FIG. 5 is a sectional view of another heating device in accordance with the present invention.

As best shown in FIGS. 2 and 5, reflector 18 may comprise a shaped reflector, such as a parabolic reflector or an elliptical shaped reflector or shield which defines a pair of focal regions 18a, 18b near opposite ends of the reflector 18. Reflector 18 may comprise an ellipsoidal reflector with an inner surface 18c polished to a specular or mirrored finish. Reflector 18 may comprise a metallic material, such as aluminum or the like, and is preferably truncated at one end such that the second focal region 18b is positioned outside of the truncated end of the reflector. Reflector 18 may comprise a two piece reflector, with one piece being truncated, or reflector 18 may comprise a single piece elliptical reflector or housing, preferably truncated at one end thereof, without affecting the scope of the present invention. Reflector 18 may further include a flange portion 18d extending radially outward from reflector 18, such as at the joining region of the two pieces, for mounting heating device 10 to a movable arm (not shown) or the like at the modular window assembly line. Other means for mounting or positioning heating device 10 at a support structure may be implemented, without affecting the scope of the present invention.

As best shown in FIG. 5, lamp 16 is positioned at one of two focal regions 18a of reflector 18. Because reflector 18 is shown as an elliptical-shaped reflector, the energy generated and radiated from infrared lamp 16 at focal region 18a will be directed or focused or targeted to maximize the energy, and thus generate heat, at the other focal region 18b, without significantly heating other areas surrounding the focal region 18b. The heating device 10 suitable for use in the present invention thus provides localized heat only to a desired area and the heat source or lamp does not come in contact with the connector 14 or the glass sheet 12. In the illustrated embodiment of FIG. 5, heating device 10 is operable to generate a temperature of greater than approximately 500 degrees F., and may generate a temperature of approximately 1000–2000 degrees F. or greater, within a short period of time at focal region 18b. The temperatures and energy or heat rates achieved may vary depending on the shape of reflector 18, the type of lamp 16 and the size and material of the connector 14, without affecting the scope of the present invention. The energy output of the heating device may be adjusted to match the process requirements.

Preferably, heating device 10 is mounted to a movable or pivotable arm or support structure or the like (not shown) which is movable to temporarily position heating device 10 at an appropriate location at or above a window assembly line, such that focal region 18b generally corresponds with the solder layer 26 of electrical connector 14, as connector 14 is positioned at the conductive element 24a of a glass sheet 12 at or near heating device 10. The heating device 10 may then be moved away from connector 14 and glass sheet 12 after the solder has melted, in order to allow the solder to cool and refreeze to secure the connector to the conductive element 24a of the glass sheet 12. The soldered connector and glass sheet may be removed (or moved along the assembly line or the like) and a new glass sheet and corresponding electrical connector may then be provided at the heating device and the process may be repeated.

Optionally, the heating device 10 may be positionable at an opposite side 12b of the glass sheet 12 to provide energy and heat to the solder 26 and electrical connector 14 from the other side of the glass sheet, without affecting the scope of the present invention. In this regard, it is preferable to utilize short wavelength infrared radiation, such as infrared radiation having a wavelength of less than approximately 1000 nm, that is substantially transmitted by the glass substrate, but that is significantly absorbed by (and thus causes heating of) the black out ceramic frit layer or the silver layer or bus bar or solder layer, thereby heating the solder at the electrical connector. Suitable short wave radiation applications or methods are disclosed in U.S. Pat. Nos. 6,203,639 and 6,054,001, which are hereby incorporated herein by reference. Because the energy is targeted at the focal region 18b, such that other regions are not significantly heated or affected by the targeted or directed or focused energy, heating device 10 may be operable to provide energy and heat from either side of the glass sheet without substantially or excessively heating the glass sheet or the electrical connector.

During operation, heating device 10 is moved relative to the glass sheet 12 such that the solder layer 26 of electrical connector 14 is positioned generally at second focal region 18b. The lamp 16 is activated and the focused or directed energy generates a high temperature at focal region 18b to melt the solder layer 26 at connector 14. The protrusions 14c at base portion 14a of connector 14 maintain the appropriate space or gap between base portion 14a and silver conductive layer or element 24a while the solder is in its molten state. After the solder is melted by heating device 10, heating device 10 is moved away from connector 14 and/or lamp 16 is deactivated, and the solder 26 is allowed to cool and refreeze to secure connector 14 to the conductive element 24a of the glass sheet 12. The electrical connector 14 may be held or secured in the appropriate position during the heating and cooling processes until the solder sufficiently cools and hardens to sufficiently retain or bond the electrical connector to the conductive element of the glass sheet.

Figure 6:
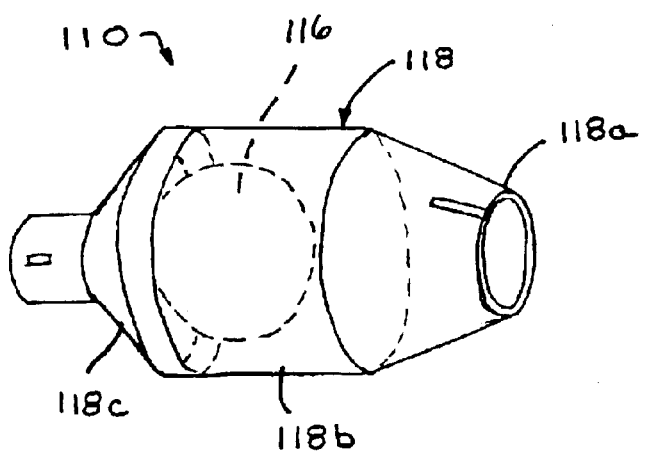
FIG. 6 is a perspective view of another heating device in accordance with the present invention.

Referring now to FIG. 6, an infrared radiative heating device 110 comprises a radiation heating device which radiates energy to a target or focal region and includes an infrared lamp or radiative heat source 116 positioned within a reflector 118. Lamp 116 may comprise any type of infrared lamp or radiative source, such as a high intensity, quartz infrared lamp or heat source, or an infrared bulb or lamp such as an EVD 36 volt, 400 watt lamp commercially available from Wiko Ltd. of Orland Park, Ill., without affecting the scope of the present invention. Infrared lamp 116 may comprise a tubular quartz, short wave infrared lamp or may comprise a long wave infrared lamp, depending on the application of the heating device. Preferably, at least some, and preferably a considerable portion, of the energy radiated from the selected lamp or radiative source is at or within the near-infrared or infrared region of the energy spectrum, such as approximately 800–1500 nm, more preferably approximately 1000–1300 nm, and most preferably approximately 1100–1200 nm.

In the illustrated embodiment of FIG. 6, reflector 118 comprises a shaped reflector having a generally cylindrical body portion which tapers or narrows to a truncated nozzle end 118a. The interior surface of reflector 118 preferably comprise a polished metallic surface which may be polished to a specular or mirrored finish. Reflector 118 may comprise a metallic material, such as aluminum or steel or the like, and is truncated at one end such that the connector 14 may be positioned at or outside of the truncated end of the reflector 118 for receiving the heat that is generated by the lamp 116 and funneled or channeled or otherwise directed generally at the truncated end 118a, as discussed below. Reflector 118 may comprise a two piece reflector having with a nozzle or funnel piece 118*b* which is truncated and a lamp mounting piece 118*c* for removably mounting the lamp 116. The lamp mounting piece 118*c* is mountable or securable to nozzle piece 118*b* at the end opposite the nozzle end 118*a*. Lamp mounting piece 118*c* may comprise a generally conical-shaped, polished interior surface to direct the energy generated from lamp 116 generally toward nozzle end 118*a* of reflector 118.

Infrared radiative lamp 116 is positioned within reflector 118 as can be seen in FIG. 6. Because reflector 118 comprises a nozzle-shaped or funnel-shaped reflector, the energy generated and radiated from infrared lamp 116 within reflector 118 will be directed or focused or targeted to maximize the energy, and thus generate heat, at the nozzle end 118*a*. Heating device 110 thus provides localized heat only to a desired area and the heat source or lamp does not come in contact with the connector 14 or the glass sheet 12 during the heating process, discussed below. For example, the distance between the lamp 116 and the solder layer 26 or connector base 14*a* may be approximately 0.5–1.5 inches during the heating process. In the illustrated embodiment, heating device 110 may generate a temperature of approximately 500 degrees F. or greater within a short period of time at nozzle end 118*a*. The temperatures and energy or heat rates achieved may vary depending on the shape of reflector 118, the type of lamp 116 and the size and material of the connector 14, without affecting the scope of the present invention. The energy output of the heating device may be adjusted to match the process requirements.

Figure 7:
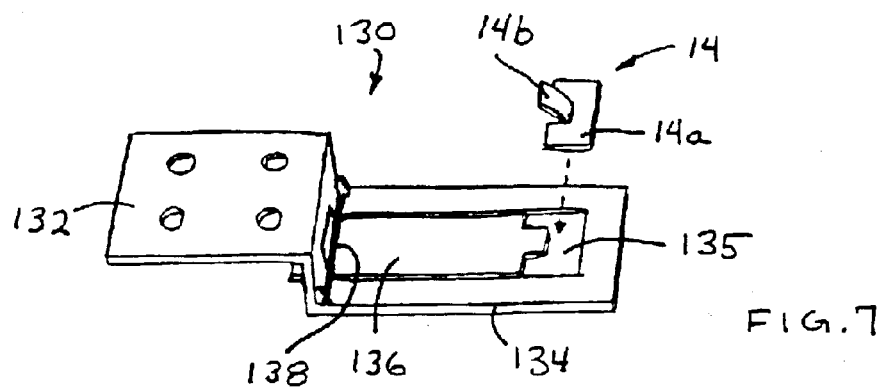
FIG. 7 is an upper perspective view of a holding device useful with the heating device of the present invention.
Figure 8:
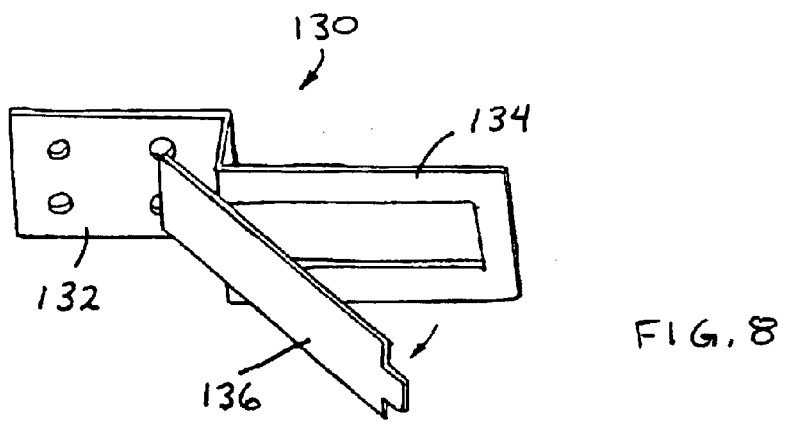
FIG. 8 is a lower perspective view of the holding device of FIG. 7.

Referring now to FIGS. 7 and 8, a connector holder and/or shield 130 may be provided or positioned at nozzle end 118*a* of reflector 118 to temporarily hold the connector 14 in place at the glass sheet during the heating or soldering process, as discussed below. Holder 130 comprises a mounting portion 132, a shield portion 134 and a pivotable shield portion 136. Mounting portion 132 may be mountable to a movable arm or member or support structure (not shown) at the window assembly plant line for moving holder 130 toward and away from heating device 110 and/or glass sheet 12 during the assembly and heating and cooling process, as also discussed below. As can be seen with reference to FIGS. 7 and 8, pivotable shield portion 136 is pivoted about a pivot axis 138 at shield portion 134 between an upward position, where pivotable shield portion 136 and shield portion 134 define a connector holding space 135 and function to generally hold or retain connector 14 for positioning connector 14 at heating device 110 and/or glass sheet 12, and a downward or releasing position, where holder 130 may release the connector 14 as holder 130 is moved away or lifted upward from the glass sheet 12 after the heating or soldering process is completed, as discussed below.

Referring now to FIGS. 9–11, the process of heating and soldering the connector 14 to the glass sheet 12 begins with the connector 14 being placed generally within the connector holding space 135 of connector holder 130, such as by being manually placed within the holding space while the connector is separated from the heating device 110 and glass sheet 12, such as shown generally in FIG. 7. The connector holder 130 and connector 14 are positioned at the glass sheet with heating device 110 being positioned generally adjacent to connector holder 130, such that connector 14 is generally positioned at nozzle end 118*a* of reflector 118, with connector portion 14*b* extending partially within reflector 118, as shown in FIG. 9. For example, connector 14 and connector holder 130 may be moved to the nozzle end 118*a* of reflector 118 and secured in an appropriate position with respect to reflector 118, and the heating device 110 and connector holder 130 and connector 14 may be moved as a unit onto the surface of the glass sheet 12. Alternately, connector 14 and connector holder 130 may be moved to the surface of the glass sheet and the heating device 110 may be moved to the connector and holder at the glass sheet, without affecting the scope of the present invention. Shield portion 134 and pivotable shield portion 136 generally surround connector 14 at nozzle end 118*a* of reflector 118 and are positioned between reflector 118 and glass sheet 12.

When heating device 110 is positioned at connector holder 130 and glass sheet 12, lamp 116 of heating device is actuated and generates radiation energy which is funneled or channeled or otherwise directed to connector 14 at glass sheet 12 by reflector 118. The heat is provided to the target area at the nozzle end 118*a* of reflector 118 and is shielded from reaching or substantially heating other areas surrounding the target area by shield portion 134 and pivotable shield portion 136 of holder or shield member 130. Accordingly, substantial heat is generated at connector 14 and/or solder layer 26, while a substantially reduced amount of heat may be directed to or may dissipate to or may reach glass sheet 12 surrounding connector 14. In a preferred embodiment, heating device 110 may rapidly generate and channel or direct heat at connector 14 at a temperature of greater than approximately 500 degrees F., and more preferably greater than approximately 540 degrees F., and most preferably greater than approximately 570 degrees F., such as for preferably approximately five to eight seconds, to melt the solder layer at connector 14. For example, the heating device may rapidly generate and direct the energy at the solder joint to be formed for less than approximately 20 seconds, more preferably less than approximately 15 seconds, and most preferably less than approximately 10 seconds. While a substantial amount of heat is thus rapidly applied to the target area, the holder 130 shields the heat or radiation from being directed to and from reaching other areas, such that the temperature of the glass sheet at and around the connector 14 is preferably not heated above approximately 175 degrees F., more preferably not heated above approximately 160 degrees F., more preferably not heated above approximately 135 degrees F., and most preferably not heated above approximately 115 degrees F.

After the solder layer is melted by heating device 110, heating device 110 may be deactivated and/or withdrawn from holder 130 and connector 14 and glass sheet 12, as shown in FIG. 10. Solder layer 26 may then cool and refreeze or harden to secure connector 14 to glass sheet 12. To shorten the cooling process, a fan or blower or cooling device 140 may be provided to blow on or increase air circulation around the connector and solder layer to cool and harden the solder layer in a shorter period of time. For example, cooling device 140 may blow or direct air at approximately 15 p.s.i. or lower to approximately 40 p.s.i. or greater at connector 14 and/or the solder joint for preferably less than approximately twelve seconds, more preferably less than approximately eight seconds, and most preferably less than approximately five seconds, to cool and harden the solder layer at connector 14 and glass sheet 12.

After the solder layer has cooled and hardened to secure connector 14 to glass sheet 12, such as to a conductive layer or the like on glass sheet 12 or directly to the surface of the glass sheet, connector holder 130 may be removed from the glass sheet 12, such as by lifting the holder 130 in a direction generally normal to and away from the surface of the glass sheet. As shown in FIG. 11, pivotable shield portion 136 may pivot downward to the releasing position as holder 130 is moved from connector 14 and glass sheet 12, to allow the holder 130 to release the connector from the connector holding space 135. A pull test may be performed on the soldered connector to ensure a secure attachment of the connector to the glass sheet. Pull tests have shown that the connector 14 may be secured on the glass sheet via the above described process such that the connector may withstand approximately 500 p.s.i. to approximately 1000 p.s.i. of pull pressure at the connector. Glass sheet 12, with connector 14 secured thereon, may be moved to the next assembly process, while a new connector is positioned in holder 130 and the process is repeated on the next glass sheet.

The connector application process of the present invention thus may rapidly attach an electrical connector to a glass sheet, preferably in less than approximately one minute, more preferably in less than approximately 45 seconds and most preferably in less than approximately 30 seconds. In a particular embodiment of the application process of the present invention, an electrical connector may be attached to a glass sheet and tested within approximately 30 seconds. More particularly, the glass sheet may be transferred or moved to the attachment station within approximately five seconds and the window element or electrical connector may be loaded to the holding device and the heating device and the holding device may be loaded or positioned at the glass sheet within approximately five seconds. The heating device may then be actuated to rapidly heat the connector and/or solder layer for approximately eight seconds, after which the connector and solder joint may cool for approximately three to five seconds. A pull test or the like may then be conducted on the connector which may take approximately three seconds. The glass sheet may then be transferred or moved out of the connector attachment station and toward the next station in approximately four seconds. The entire attachment process of a typical embodiment of the present invention thus may take approximately 30 seconds to complete.

The rapid heat and melt time provided by the heating device 110 thus may result in the completion of the attachment of the connector to the glass sheet in less than approximately thirty to forty seconds. Also, the heating process heats the connector rapidly, while substantially limiting directing of heat toward or into the glass sheet. The present invention thus facilitates attachment of the connector within a short period of time and limits or substantially precludes damage to the glass sheet which may occur if the glass sheet is rapidly heated or overheated, as may occur during some conventional processes. The present invention thus facilitates attaching the connector or other window element or component or hardware to a glass sheet along the window assembly line at a modular window assembly plant.

Figure 12:
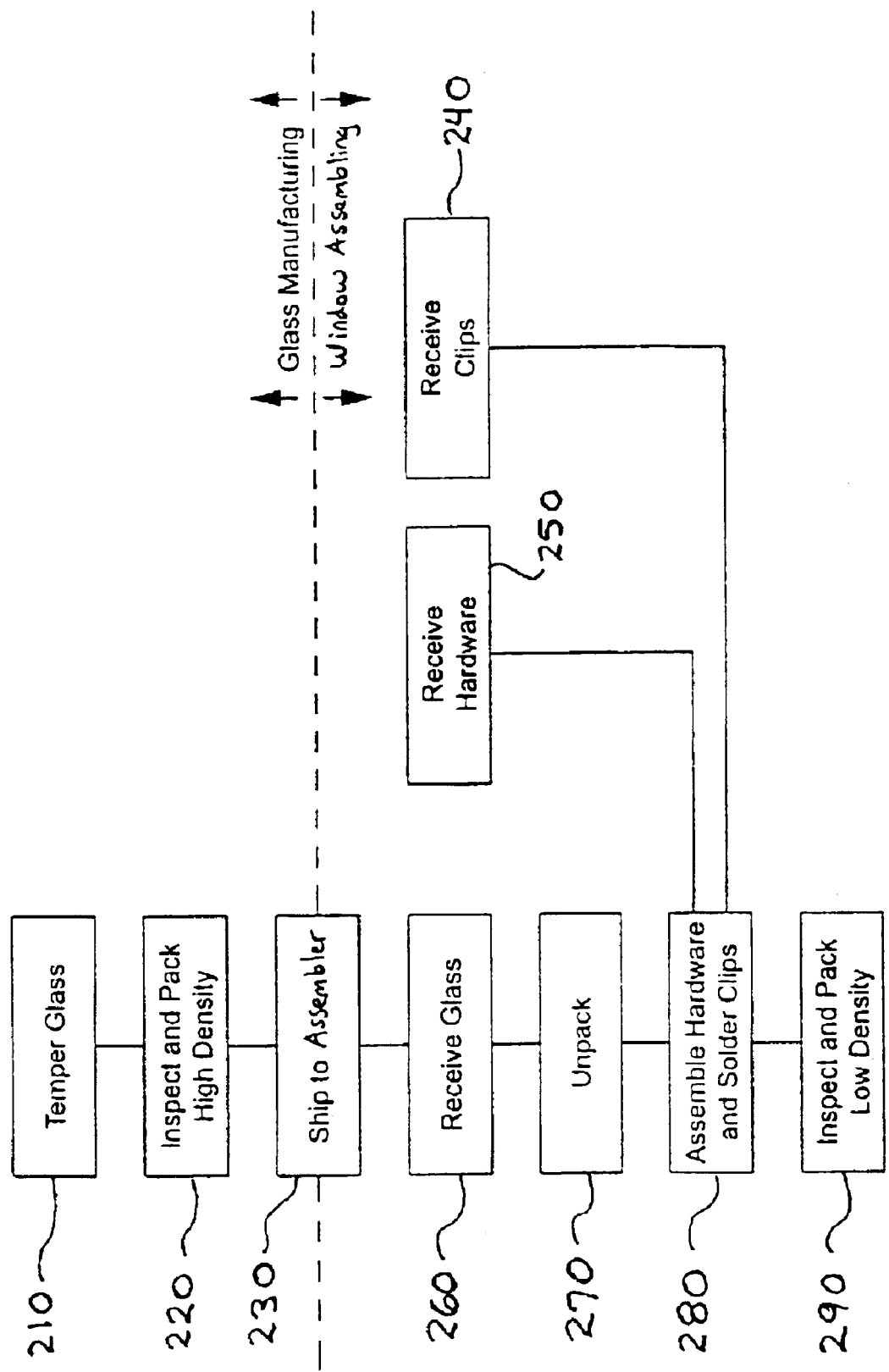
FIG. 12 is a process diagram in accordance with the present invention of the steps involved in manufacturing and assembling a modular window assembly, with the electrical connectors being attached or soldered to the glass sheets at a vehicular or modular window assembly plant.

Because the heating device of the present invention may comprise a relatively low cost device and requires little plant space to use and may rapidly solder the connector or window element to the glass sheet while substantially limiting directing of or dissipation of the energy toward or to the glass sheet, it is envisioned that the heating device may be implemented at a modular window assembly plant where the frame, seals, hinges and/or the like are attached to the glass sheet, instead of at the glass manufacturing or fabrication plant, where glass sheets are formed or fabricated and where electrical connectors are typically attached to glass sheets. As shown in FIG. 12, a manufacturing and assembly process 200 for manufacturing a modular window assembly in accordance with the present invention may include manufacturing a tempered glass sheet (or other type of glass sheet, such as an annealed glass sheet or a laminated glass sheet or the like) at 210 and inspecting and packing the glass sheets at 220 at a glass fabrication or manufacturing plant. The tempered glass sheets may be packed in a high density manner since they do not include any connectors or frames or seals or the like extending therefrom. The packed glass sheets are then shipped to a vehicular or modular window assembly plant at 230.

The modular window assembly plant receives connectors or clips at 240 and other window hardware (such as hinges, frames, seals and/or the like) at 250. The modular window assembly plant also receives the glass sheets from the glass manufacturing plant at 260 and unpacks the glass sheets at 270. The connectors are soldered to the sheets in the manner described above and the hardware is assembled onto the glass sheet at 280. The modular window assembly plant then inspects and packs the assembled vehicular or modular window assemblies in a low density manner at 290 for shipment or transport to the vehicle assembly plant or facility.

Figure 1:
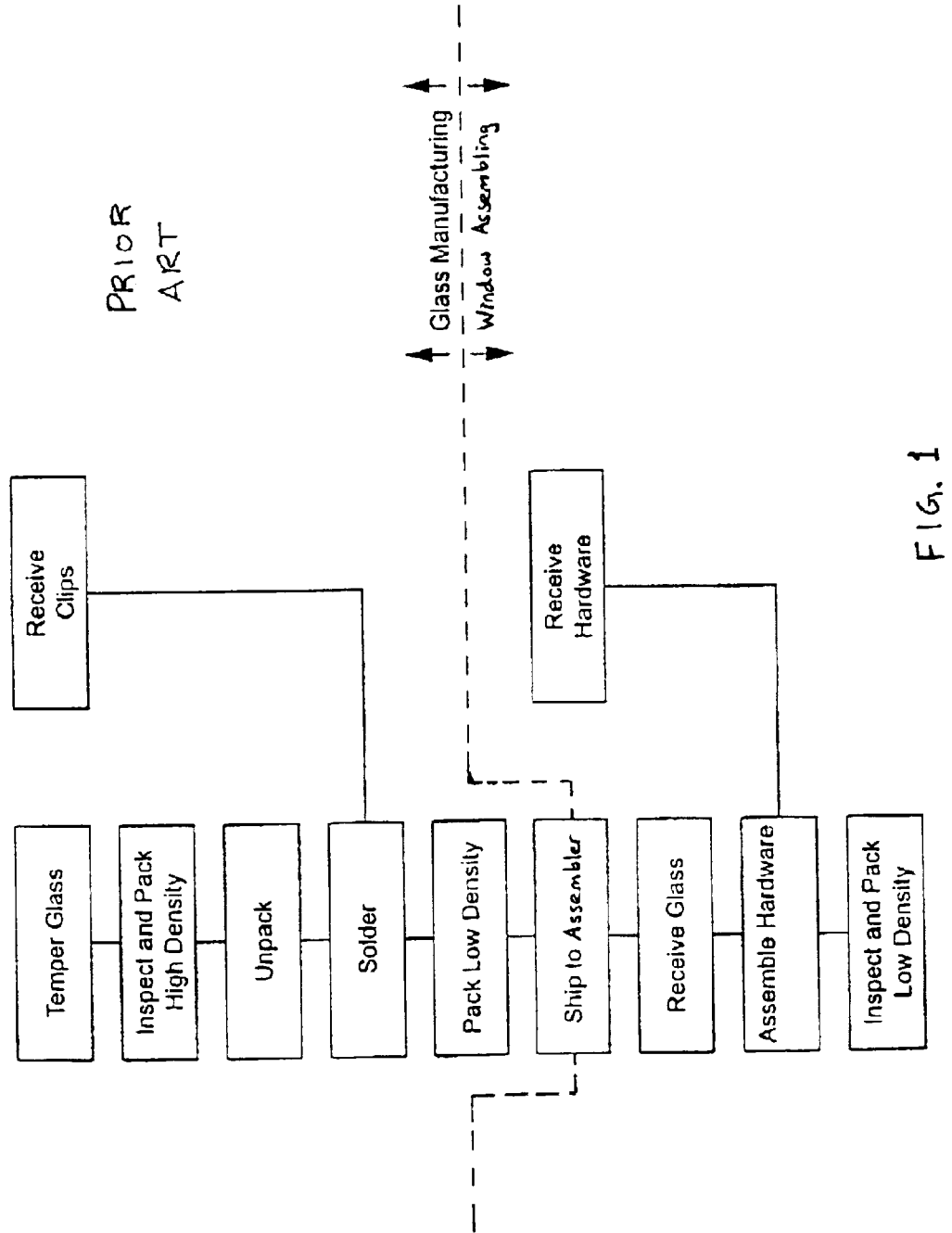
FIG. 1 is a process diagram of the conventional steps involved in manufacturing and assembling a window assembly.

The present invention thus allows the glass manufacturing plant or glass fabrication plant to pack the glass sheets in a high density manner one time and to ship the densely packaged glass sheets to the modular window assembly plant. This avoids the extra packing and unpacking step of the conventional processes, such as the conventional process shown in FIG. 1, and allows a greater number of glass sheets to be shipped in a container to the modular window assembly plant. The densely packaged glass sheets may then be unpacked at the modular window assembly plant and assembled to the completed modular window assembly forms. The completed modular window assemblies may then be packed in a low density manner for shipment to the automotive vehicle assembly plant.

Therefore, the present invention provides a low cost, efficient device and method and system for attaching or soldering an electrical connector to a conductive element of a glass sheet of a vehicle window. The radiation heating device of the present invention provides localized energy and heat to a desired and targeted area corresponding to a solder layer between the electrical connector and the glass sheet, and may not substantially or excessively heat other portions of the product, such as the glass sheet generally surrounding the connector. The heating device may substantially and rapidly heat the connector and/or solder layer, while substantially limiting directing of heat toward or into the glass sheet. Also, the present invention provides a non-contacting heat source or lamp which does not contact the electrical connector or glass sheet during the heating and soldering process.

Additionally, because of the rapid heating time of the solder layer by the heating device and the substantially reduced heating of the glass sheet during the heating process, the radiation heating device of the present invention may be implemented at a glass or window manufacturing plant or at a vehicular or modular window assembly plant. By implementing the heating device of the present invention at the vehicular or modular window assembly plant, the present invention enhances the efficiency of the window manufacturing and assembly processes, thereby reducing the overall costs of the window assembly.

Changes and modifications in the specifically described embodiments can be carried out without departing from the principles of the present invention, which is intended to be limited only by the scope of the appended claims, as interpreted according to the principles of patent law.

The embodiments of the invention in which an exclusive property or privilege is claimed are defined as follows:

1. A method for applying an electrical connector to a conductive element disposed on a surface of a glass sheet of a window, said method comprising:

providing a glass sheet having a conductive element disposed on a surface thereof;

providing an infrared radiative heating device comprising an infrared lamp and a reflector configured to direct radiant energy generated by said lamp at a target region;

positioning an electrical connector at said conductive element of said glass sheet;

positioning said heating device relative to said glass sheet such that said target region corresponds generally with the location of a solder layer between said electrical connector and said conductive element of said glass sheet; and attaching said electrical connector to said conductive element via radiation heating of said solder layer with said infrared radiative heating device.

2. The method of claim 1, wherein attaching said electrical connector to said conductive element comprises attaching said electrical connector to said conductive element via radiation heating of a layer of solder applied to a surface of said electrical connector.

3. The method of claim 1, wherein providing an infrared radiative heating device comprises providing an infrared radiative heating device comprising an infrared lamp and a shaped reflector configured to direct radiant energy generated by said lamp at a target region.

4. The method of claim 3, wherein said shaped reflector comprises one of a parabolic-shaped reflector, an ellipsoid-shaped reflector and a nozzle-shaped reflector.

5. The method of claim 3, wherein said shaped reflector defines first and second focal points, said infrared lamp being positioned generally at said first focal point and said target region being generally at said second focal point.

6. The method of claim 3, wherein said shaped reflector comprises a truncated shaped reflector.

7. The method of claim 6, wherein said infrared lamp is positioned at an interior of said truncated shaped reflector and said target region is positioned at an exterior of said truncated shaped reflector.

8. The method of claim 3, wherein said shaped reflector comprises a metallic material having a polished interior surface.

9. The method of claim 1 including limiting directing of heat to said glass sheet during said radiation heating of said solder layer.

10. The method of claim 9 including providing a shield generally surrounding said connector at said glass sheet for limiting directing of heat to said glass sheet.

11. The method of claim 10, wherein said shield functions to temporarily hold said connector at said glass sheet during said radiation heating.

12. The method of claim 11, wherein said shield includes a pivotable shield portion which pivots to release said shield from said connector after said radiation heating of said solder layer.

13. The method of claim 1, wherein positioning an electrical connector comprises positioning an electrical connector and said solder layer at a first surface of said glass sheet, and wherein positioning said heating device comprises positioning said heating device adjacent to a second surface of said glass sheet, said second surface being generally opposite said first surface.

14. The method of claim 13, wherein said heating device is operable to radiate energy through said glass sheet to said focal region at said first surface of said glass sheet.

15. The method of claim 14, wherein said glass sheet substantially transmits said infrared radiation and said solder layer substantially absorbs said infrared radiation.

16. The method of claim 14, wherein said infrared lamp is operable to generate infrared radiation having a wavelength of less than approximately 1200 nm.

17. The method of claim 1, wherein said infrared lamp is operable to generate infrared radiation having a wavelength of less than approximately 1200 nm.

18. The method of claim 1, wherein providing a glass sheet comprises providing a glass sheet at a modular window assembly plant.

19. A method for manufacturing and assembling a window assembly comprising:

providing a glass sheet;

providing an infrared radiative heating device comprising an infrared lamp and a shaped reflector configured to direct radiant energy from said lamp at a target region;

positioning a window element in a holder;

positioning said holder and said window element generally at said glass sheet;

positioning said heating device relative to said holder such that said target region corresponds generally with the location of a layer of solder at one of said window element and said glass sheet;

heating said solder layer via radiation heating of said solder layer with said infrared radiative heating device; and substantially limiting directing of said heat to said glass sheet via said holder.

20. The method of claim 19 including applying a conductive element on a surface of said glass sheet, wherein positioning said holder and said window element generally at said glass sheet comprises positioning said holder and said window element generally at said conductive element, said solder layer being at one of said window element and said conductive element.

21. The method of claim 20, wherein positioning a window element in a holder comprises positioning an electrical connector in a holder.

22. The method of claim 19 including:

fabricating a glass sheet at a glass sheet fabrication plant; and transporting said glass sheet from said glass sheet fabrication plant to a modular window assembly plant remote from said glass sheet fabrication plant.

23. The method of claim 22, wherein providing an infrared radiative heating device comprises providing an infrared radiative heating device at said modular window assembly plant remote from said glass sheet fabrication plant.

24. The method of claim 23 including assembling at least one of a seal, a hinge and a frame to said glass sheet at said modular window assembly plant.

25. The method of claim 19 including at least one of deactivating said infrared radiative heating device and removing said infrared radiative heating device from said holder and said glass sheet after heating said solder layer.

26. The method of claim 25 including cooling said solder layer after heating said solder layer.

27. The method of claim 26 including removing said holder from said window element after cooling said solder layer.

28. The method of claim 27, wherein removing said holder comprises pivoting a portion of said holder relative to another portion of said holder to release said holder from said window element.

29. The method of claim 19, wherein said infrared lamp is positioned at an interior of said shaped reflector and said target region is positioned at an exterior of said shaped reflector.

30. The method of claim 19, wherein said shaped reflector comprises a metallic material having a polished interior surface.

31. The method of claim 19, wherein said shaped reflector comprises one of a parabolic-shaped reflector, an ellipsoid-shaped reflector and a nozzle-shaped reflector.

32. The method of claim 19, wherein said shaped reflector comprises a truncated shaped reflector having an open end.

33. The method of claim 32, wherein said lamp is positioned generally within said truncated shaped reflector and said target region is positioned generally outside of said truncated shaped reflector and generally at said open end.

* * * * *